United States Patent [19]

Kupchick

[11] 4,078,287
[45] Mar. 14, 1978

[54] METHOD OF FORMING SEALING MEMBERS

[75] Inventor: John Joseph Kupchick, Forestville, Conn.

[73] Assignee: TRW Inc., Cleveland, Ohio

[21] Appl. No.: 677,710

[22] Filed: Apr. 16, 1976

[51] Int. Cl.² ............................................. B21D 53/12
[52] U.S. Cl. .................................................. 29/148.4 S
[58] Field of Search ................... 29/148.4 S, 557, 558; 113/116 H, 116 V, 80 R, 117; 277/94; 308/187.1, 187.2

[56] References Cited

U.S. PATENT DOCUMENTS

| | | | |
|---|---|---|---|
| 2,734,757 | 2/1956 | Martin | 277/94 |
| 2,850,792 | 9/1958 | Cobb | 308/187.2 |
| 3,268,984 | 8/1966 | Kupchick | 29/148.4 S |
| 3,557,420 | 1/1971 | Matt et al. | 29/148.4 S |
| 3,959,061 | 5/1976 | Renck | 113/80 D |

*Primary Examiner*—Michael J. Keenan

[57] ABSTRACT

A method of forming a sealing member comprising a metal body having a resilient material thereon and a resiliently deflectable lip member extending inwardly from the edge of a hole in the metal body for sealingly contacting a surface, including the steps of: (a) forming a hole in a generally flat, comparatively thin metal sheet; (b) coating at least one side of the metal sheet with a resilient material in such a manner that the resilient material at least covers the hole; (c) cutting away a predetermined amount of resilient material inwardly of the edge of the hole to form the resiliently deflectable lip member, and (d) forming the metal sheet and resilient coating into a predetermined shape defining the outer configuration for the sealing member.

6 Claims, 12 Drawing Figures

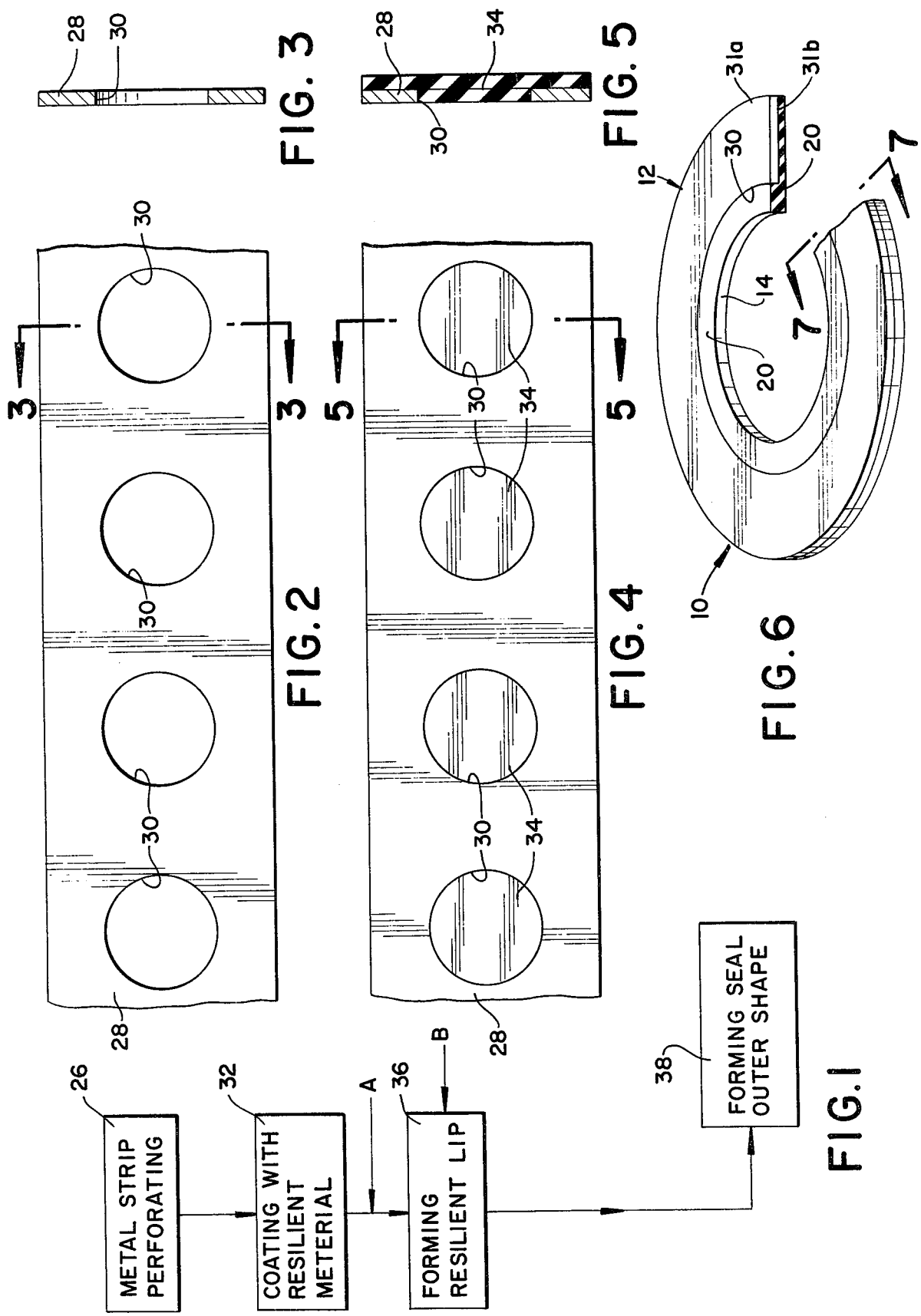

METHOD OF FORMING SEALING MEMBERS

This invention relates generally to the manufacture of sealing members such as bearing seals, gaskets, or the like, and particularly to a reliable and effective method of producing such sealing members.

Sealing members for assemblies such as ball bearings comprise a ring member the outer periphery of which sealingly contacts the inner periphery of the outer bearing race and the inner periphery of which sealingly contacts the outer periphery of the inner bearing race. Generally the sealing ring member is held in place by means of a resilient portion thereof which applies a predetermined degree of pressure to a structural surface of the bearing. In ball bearing assemblies it is conventional that the sealing ring member include a precisely dimensioned resilient circular lip for engaging the outer periphery of the inner bearing race and which applies a predetermined amount of pressure against a surface on the outer periphery of the inner bearing race. A known form of such bearing seal member is disclosed in U.S. Pat. No. 2,467,049.

In forming a bearing seal such as disclosed in U.S. Pat. No. 2,467,049, a metal ring is formed having a substantially circular flange about its outer periphery. The metal ring is then placed in a suitable mold or die, and rubber or other comparable resilient material injected thereabout. The rubber coats the outer formed edge, and the shape of the die forms the resilient material into a circular lip extending inwardly of the inner periphery of the ring as well as outwardly of the outer periphery of the metal ring. This method is capable of forming the bearing seal with a precisely dimensioned resilient lip extending inwardly from the inner periphery of the metal ring. However, this is a fairly time consuming process, which is relatively expensive, and which requires a considerable amount of operator handling. Economics have long dictated the need for a less expensive, continuous process, and moreover one which minimizes operator handling time of the various elements involved.

In U.S. Pat. No. 2,850,792, there is disclosed another known method of making bearing seals. A sheet of metal is bonded to a sheet of rubber-like material, and flat rings are stamped out of the metal sheet and rubber-like resilient coating. The patentee relies upon which is termed the "inherent resiliency" of the rubber-like coating to compress under pressure and radially deform away from the die before the die cuts through the rubber, with the result that after the die has been withdrawn the rubber coating resiliently returns to an uncompressed state which leaves a bore in the rubber of smaller diameter than the bore formed in the sheet material. As a result, a circular rubber lip is provided which extends inwardly from the inner periphery of the metal ring. This method, while potentially capable of running continuously for periods of time, has certain important drawbacks in terms of the degree of control which can be exercised over the dimension of the resilient radially inwardly projecting lip produced. Specifically, in relying on the so-called "inherent resiliency" of the resilient material, the method of this reference is limited in terms of the radial length of lip which it can produce. Moreover, not only is the total radial length limited but, also, the method appears to be limited in its ability to control the tolerances of this length. An additional disadvantage is that the axial thickness of the lip must, of course, be limited to the thickness of the applied coating.

SUMMARY OF THE INVENTION

The present invention provides an efficient process of making sealing members of the type wherein a resilient lip extends inwardly of the hole formed in a metallic ring-shaped member. The sealing members are formed through a series of steps which allow precise control over the final inwardly projecting resilient lip dimension, and thereby allows precise control over the sealing pressure which is exerted by the lip against a surface of the member which is contacted by the sealing member. Also, the lip can have a thickness greater than the thickness of the coating on the metal ring-shaped member. At the same time, the present invention discloses a process which is capable of continuous operation, which requires minimum operator handling, and is considerably less costly than the above-described molding process.

According to the preferred embodiment of this invention, a sealing member in the form of a metal body having a resilient material thereon and a resiliently deflectable lip member extending radially inwardly from the edge of the hole in the metal body is formed by the steps of:

a. forming at least one hole in a generally flat, comparatively thin metal sheet;

b. coating one side of the metal sheet with a resilient material in such a manner that the resilient material covers said at least one hole and is bonded to said metal sheet;

c. cutting away a predetermined amount of resilient material radially inwardly of the edge of said at least one hole in the metal sheet to form a resiliently deflectable, radially inwardly extending lip member having a predetermined radial length; and d. forming the metal sheet and resilient coating into a predetermined outer peripheral shape defining the outer configuration for the sealing member.

In accordance with an additional and somewhat more limited aspect of the invention, the metal sheet is preferably in the form of an elongated continuous strip through which a spaced series of holes are formed. Preferably, the coating step is carried out to completely coat one side of the strip and substantially fill the holes. Thereafter, the cutting and forming steps are performed relative to each hole to produce seal members having the desired final configuration.

In an additional feature of this invention there is provided an improved method of shaping the outer portion of the sealing member in order to properly engage a cooperable surface such as a bearing race. The step of forming the outer configuration of the sealing member includes the step of providing slits through the resilient material prior to a mechanical deforming step so as to prevent tearing of the resilient material during the mechanical deforming step.

BRIEF DESCRIPTION OF THE DRAWINGS

Further objects and advantages of this invention will become further apparent from the following description made with reference to the accompanying drawings wherein:

FIG. 1 is a block diagram illustrating the fundamental steps of the present invention;

FIG. 2 is a top-plan view of a section of an elongated metal strip having a series of holes formed therein according to the present invention;

FIG. 3 is a cross-sectional view of the metal strip of FIG. 2 taken approximately along the line 3—3;

FIG. 4 is a top-plan view of a section of an elongated metal strip after the section of the elongated metal strip has been coated with a resilient material in accordance with the present invention;

FIG. 5 is a view of the strip of FIG. 4, taken approximately along the line 5—5;

FIG. 6 is a pictorial view of a sealing element formed in the shape of a circular washer according to the invention, prior to being mechanically deformed into the shape of a bearing seal (a portion of the element has been broken away to more clearly show details of construction);

DETAILED DESCRIPTION OF THE PREFERRED EMBODIMENT OF THE INVENTION

As set forth above, the present invention relates to a continuous process for making bearing seals, gaskets, or other forms of comparable sealing members. The invention as disclosed below relates to the manner in which this invention is particularly adapted to form a bearing seal for a ball bearing. However, from the description which follows, the manner in which the present invention can be applied to form numerous comparable forms of sealing members will become readily apparent to those of ordinary skill in the art.

Figure 11:
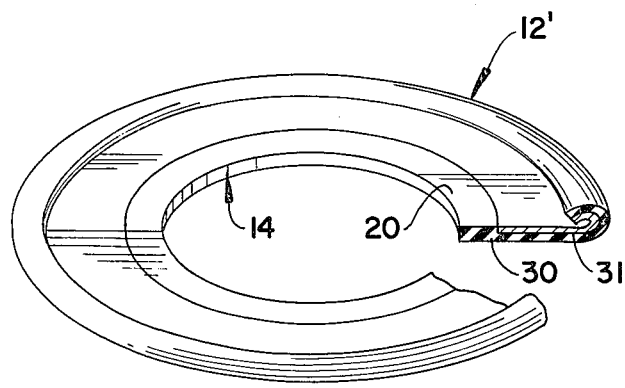
FIG. 11 is a pictorial view of a completed bearing seal formed by the method of the invention (a portion has been broken away to facilitate understanding)
Figure 12:
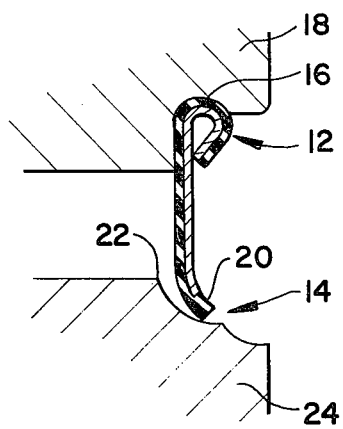
FIG. 12 is a partial sectional view of a portion of a bearing with a bearing seal in place.

Referring first tp FIG. 6, there is disclosed a sealing member 10 in the general shape of a flat washer which is formed in accordance with the invention. The member 10 includes an outer periphery 12 and an inner periphery 14. In forming the member 10 into a bearing seal the outer periphery 12 is mechanically formed into the shape which is shown in FIGS. 11 and 12 and which in use fits within a generally circular recess 16 in an outer bearing race 18 (FIG. 12). The inner periphery or bore of the bearing seal is formed by a flexible lip 20 of a resiliently deflectable material which applies pressure against a generally curved surface 22 of the inner bearing race 24. The lip 20 is adapted to apply both axially and radially directed pressure against the curved surface 22, and this pressure is important to the proper sealing action of the bearing seal. It is the primary object of the preferred embodiment of this invention to automatically and continuously form such bearing seals with a precisely determined sealing lip.

Referring now to FIG. 1, the first step in forming a sealing member according to the invention includes the step of forming a hole 30 in a generally flat, relatively thin metal sheet 31. Preferably the metal sheet is a steel strip which is unwound from a steel strip coil and passed to a punching station 26 at which a spaced series of holes 30 are punched between the opposed side faces 31a and 31b. FIGS. 2 and 3 illustrate a section of metal strip 28 in which a series of holes 30 have been made. It is contemplated that the step of forming the holes 30 may be effected by a conventional punch press. A conventional distance control mechanism is associated with the punch press so as to control punching of the holes 30 at substantially equal distances along the metal strip.

After the metal sheet has been punched it is preferably cleaned and then fed to a coating station 32 at which one side face is coated with resilient material in such a manner that the resilient material is tightly bonded or adhered to the metal and at least covers the holes 30. Actual filling of the holes is sometimes preferred since this allows formation of a sealing lip of a thickness greater than the thickness of the resilient material applied to the face of the strip. As can be appreciated, by controlling the depth to which the hole is filled the thickness of the resulting lip can be varied. The preferred embodiment of this invention contemplates a rubber coating of Nitrile or Natural Rubber of 55–65 Shore Hardness, though many other elastomers may be suitable.

There are various ways in which the resilient material may be applied to the metal. In the preferred embodiment a web of the resilient material is superimposed on the metal and pressure applied by means of a pressure roller.

Another way of applying the resilient material to the metal is by applying resilient material in a plastic state to the metal and maneuvering a series of doctor blades in what is known in the art as a "puddling" operation to spread the resilient material over a portion of the metal. Yet another way is to initially cut resilient material, in an uncured state, into sheets of desired size, and then bring the sheet of resilient material and the metal together. It is contemplated that in view of the aforesaid disclosure numerous other ways of applying resilient material to the metal will be readily apparent to those of ordinary skill in the art.

The coating of the metal with the resilient material is followed by a curing step. The curing step includes a heat curing step and, where necessary, a pressure curing step. Pressure curing is generally used in thos instances where the coating step does not itself employ sufficient pressure to ensure that the resilient material substantially fills the holes 30.

Also, depending upon the choice of resilient material used, there may be a need for application of a primer to the metal prior to the coating step. The primer may be sprayed on the metal, or the metal may be dipped in the primer material. The primer may be quick cured at high temperature, or may be air dried. The use of a primer is generally necessitated where, because of the nature of the resilient material, there is a need to augment the adherence of the resilient material to the metal, including the periphery of the hole which have been punched in the metal.

As seen by FIGS. 4 and 5, the coating of the metal with resilient material 34, and the above-described curing or pressure steps, will provide a sheet of material in which the resilient material 34 at least covers, and preferably fills, the holes 30 formed in the metal.

According to the preferred embodiment represented by FIG. 1, the step of coating the metal with resilient material is followed by the step of forming the resilient material into a precisely shaped resilient lip at a station 36. This step includes the cutting away of a predetermined amount of the resilient material which is inward of the inner periphery of the holes 30. Such cutting away may be accomplished, for example, by a single-stroke punch press and die apparatus, which can be of conventional nature. It should be noted that by positively cutting the resilient material as a separate step, an important degree of control can be exercised over the dimension of the lip diameter. While the use of a punch press is preferred, it is contemplated that numerous comparable ways of performing the cutting step will be readily apparent to those of ordinary skill in the art.

Referring now back to FIG. 1, the final step according to the preferred embodiment of this invention comprises the formation of the outer configuration of the sealing member at a station 38. In the embodiment illustrated by FIG. 6, the sealing member is formed as a substantially flat circular washer with a circular outer periphery. The final formation of the outer periphery is preferably by a conventional stamping or a step-forming operation. It is also contemplated that the forming of the outer configuration of the sealing member could be performed between the coating of the metal with resilient material and the lip forming step, as shown by the arrow A in FIG. 1, or it could be performed contemporaneously with the lip forming step, as shown by the arrow B in FIG. 1. It is also contemplated that where the forming of the outer shape of the seal is to precede the lip forming step, a plurality of seals could be collected after their outer shapes have been stamped, the seals collected, and stored for use in a subsequent operation in which each of their portions are formed.

Figure 7:
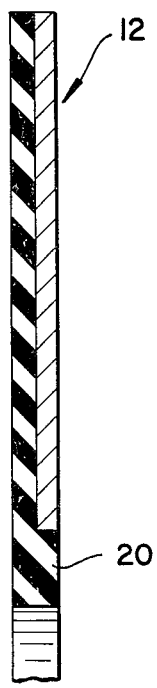
FIG. 7 is a fragmentary cross-sectional view of a sealing element formed in accordance with the present invention corresponding generally to a portion of the combined metal strip and resilient material shown by section lines 7—7 in FIG. 6.
Figure 8:
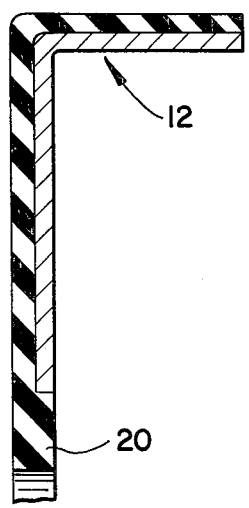
FIG. 8 is a cross-sectional view of the sealing member of FIG. 7 after an initial mechanical forming step.
Figure 9:
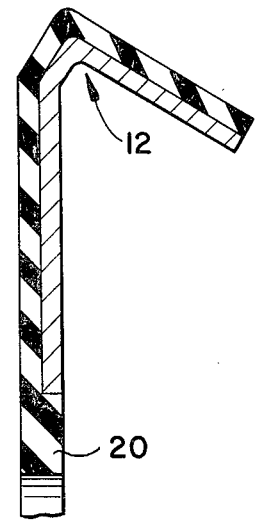
FIG. 9 is a sectional view of the sealing member of FIG. 8 after a second mechanical forming step.

FIG. 7 represents a fragmentary cross-sectional view of a sealing member in the form of a circular washer after the outer periphery and the resilient lip have been formed. In order to further form the member into a bearing seal the preferred embodiment contemplates an initial forming step in which the outer periphery 12 of the bearing seal is mechanically deformed into the shape shown in FIG. 8. A second mechanical deforming step, preferably by means of a conical former or other comparable means, is then used to further form the outer periphery 12 into a generally conical shape, as shown in cross-section in FIG. 9. The outer periphery 12 could be bent into a slightly curved shape (FIGS. 11 and 12), which is a common shape for a ball bearing seal. Many types of conventional forming presses, such as in line transfer presses, could be used for the forming operations.

It should be appreciated that for many uses the outer periphery could be left unformed. Similarly, a variety of periphery forms other than that illustrated could be provided.

Figure 10:
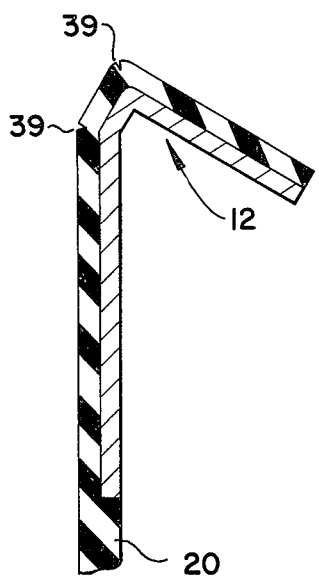
FIG. 10 is a sectional view of a sealing member after a second mechanical forming step and wherein score lines have been provided through the resilient material in accordance with an additional feature of the present invention.

In an additional aspect of this invention, there is provided an additional step for facilitating mechanical deformation of the seal. this step contemplates a series of score lines or cuts 39 (FIG. 10) at precise points around the periphery of the resilient coating prior to the mechanical deforming of the outer periphery 12 of the seal. The score lines 39 penetrate at least partially through the resilient coating but not the metal sheet. Initial forming of the score lines in this manner helps prevent the tearing away of the resilient material from the metal sheet during the final mechanical deforming operations. FIG. 10 represents a bearing seal with score lines 39 after the seal has been mechanically deformed.

Thus, by virtue of the foregoing specification there has been described a method of efficiently and continuously forming a sealing member with a precisely dimensioned resiliently deflectable lip. With the foregoing disclosure in mind, many and varied obvious modifications of this method will become further apparent to those of ordinary skill in the art.

Therefore, what is claimed is:

1. A method of forming a sealing member comprising an annular metal body having a resilient material secured in covering relation on one side thereof and which forms a resiliently deflectable lip member extending inwardly from the edge of a hole in the annular metal body for sealingly contacting a surface around which the annular body extends, said method including the steps of forming at least one hole in a thin metal sheet, securing a resilient material on one side of the metal sheet in such a manner that the resilient material covers said hole formed in said metal sheet and a portion thereof extends into and at least partially fills the hole in the metal sheet, cutting away a predetermined amount of resilient material inwardly of the edge of the one hole to form the resiliently deflectable lip member extending radially inwardly of the edge for sealingly contacting the surface, and forming a portion of the metal sheet and resilient material into a predetermined shape defining the outer configuration for the sealing member and including the step of cutting the thin metal sheet and the resilient material into a predetermined annular shape.

2. A method of forming a sealing member comprising an annular metal body having a resilient material secured in covering relation on one side thereof and which forms a resiliently deflectable lip member extending inwardly from the edge of a hole in the annular metal body for sealingly contacting a surface around which the annular body extends, said method including the steps of forming at least one hole in a thin metal sheet, securing a resilient material on one side of the metal sheet in such a manner that the resilient material covers said hole formed in said metal sheet, cutting away a predetermined amount of resilient material inwardly of the edge of the one hole to form the resiliently deflectable lip member extending radially inwardly of the edge for sealingly contacting the surface, and forming a portion of the metal sheet and resilient material into a predetermined shape defining the outer configuration for the sealing member and including the step of cutting the thin metal sheet and the resilient material into a predetermined annular shape, and wherein the metal sheet includes first and second surfaces, and including the step of securing the resilient material to said first surface and providing a portion thereof extending into the hole formed in the metal sheet to completely fill the hole.

3. A method of forming a plurality of sealing members each of which comprises an annular metal body having a resilient material secured in covering relationship on one side thereof and which forms a resiliently deflectable lip member extending inwardly from the edge of a hole in the annular metal body for sealingly contacting a surface around which the annular body extends, said method including the steps of forming a plurality of holes in a thin metal sheet, securing resilient material on one side of the thin metal sheet in such a manner that the resilient material covers said plurality of holes formed in said thin metal sheet, cutting away a predetermined amount of resilient material inwardly of the edge of a first one of the plurality of holes in the metal sheet to form a resiliently deflectable lip member extending radially inwardly of the edge of said first one of the holes forming a portion of the metal sheet and resilient material surrounding said first one of the holes into a predetermined shape defining the outer configuration for a sealing member and including the step of cutting the thin metal sheet and the resilient material surrounding said first one of the holes into a predetermined annular shape, cutting away a predetermined amount of resilient material inwardly of the edge of a second one of the plurality of holes to form a resiliently deflectable lip member extending radially inwardly of the edge of said second one of the holes, and forming a portion of the metal sheet and resilient material surrounding said second one of the holes into a predetermined shape defining the outer configuration for a sealing member and including the step of cutting the thin metal sheet and the resilient materiaal surrounding said second one of said holes into a predetermined annular shape, and wherein the step of securing resilient material on one side of the metal sheet to cover said plurality of holes includes the step of providing a portion of the resilient material covering said plurality of holes extending into and at least partially filling said plurality of holes formed in the metal sheet.

4. A method of forming a plurality of sealing members each of which comprises an annular metal body having a resilient material secured in covering relationship on one side thereof and which forms a resiliently deflectable lip member extending inwardly from the edge of a hole in the annular metal body for sealingly contacting a surface around which the annular body extends, said method including the steps of forming a plurality of holes in a thin metal sheet, securing resilient material on one side of the thin metal sheet in such a manner that the resilient material covers said plurality of hole formed in said thin metal sheet, cutting away a predetermined amount of resilient material inwardly of the edge of a first one of the plurality of holes in the metal sheet to form a resiliently deflectable lip member extending radially inwardly of the edge of said first one of the holes forming a portion of the metal sheet and resilient material surrounding said first one of the holes into a predetermined shape defining the outer configuration for a sealing member and including the step of cutting the thin metal sheet and the resilient material surrounding said first one of the holes into a predetermined annular shape, cutting away a predetermined amount of resilient material inwardly of the edge of a second one of the plurality of holes to form a resiliently deflectable lip member extending radially inwardly of the edge of said second one of the holes, and forming a portion of the metal sheet and resilient material surrounding said second one of the holes into a predetermined shape defining the outer configuration for a sealing member and including the step of cutting the thin metal sheet and the resilient material surrounding said second one of said holes into a predetermined annular shape, and wherein the metal sheet includes first and second surfaces, and including the step of securing the resilient material to one of the surfaces and providing a portion thereof extending into said plurality of holes to completely fill the plurality of holes in the thin metal sheet.

5. A method of forming a plurality of sealing members each of which comprises an annular metal body having a resilient material secured in covering relationship on one side thereof and which forms a resiliently deflectable lip member extending inwardly from the edge of a hole in the annular metal body for sealingly contacting a surface around which the annular body extends, said method including the steps of forming a plurality of holes in a thin metal sheet, securing resilient material on one side of the thin metal sheet in such a manner that the resilient material covers said plurality of holes formed in said thin metal sheet, cutting away a predetermined amount of resilient material inwardly of the edge of a first one of the plurality of holes in the metal sheet to form a resiliently deflectable lip member extending radially inwardly of the edge of said first one of the holes, cutting the thin metal sheet and the resilient material surrounding said first one of the holes into a predetermined annular shape, bending a portion of the metal sheet and resilient material surrounding said first one of the holes into a predetermined shape defining the outer configuration for a sealing member, cutting away a predetermined amount of resilient material inwardly of the edge of a second one of the plurality of holes to form a resiliently deflectable lip member extending radially inwardly of the edge of said second one of the holes, cutting the thin metal sheet and the resilient material surrounding said second one of said holes into a predetermined annular shape, and bending a portion of the metal sheet and resilient material surrounding said second one of the holes into a predetermined shape defining the outer configuration for a sealing member.

6. A method as set forth in claim 5 further comprising the step of cutting at least partially through the resilient material adjacent the location where said metal sheet is to be bent to minimize tearing of the resilient material from the metal sheet.

* * * * *